(12) United States Patent
Ota

(10) Patent No.: US 11,165,996 B2
(45) Date of Patent: Nov. 2, 2021

(54) DISPLAY SYSTEM, DISPLAY DEVICE, AND CONTROL METHOD FOR DISPLAY DEVICE

(71) Applicant: SEIKO EPSON CORPORATION, Tokyo (JP)

(72) Inventor: Susumu Ota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/663,459

(22) Filed: Oct. 25, 2019

(65) Prior Publication Data

US 2020/0137366 A1 Apr. 30, 2020

(30) Foreign Application Priority Data

Oct. 26, 2018 (JP) .............................. JP2018-202099

(51) Int. Cl.
*G06T 7/60* (2017.01)
*H04N 9/31* (2006.01)
*G06K 9/00* (2006.01)

(52) U.S. Cl.
CPC ....... *H04N 9/3179* (2013.01); *G06K 9/00362* (2013.01); *G06T 7/60* (2013.01); *H04N 9/3197* (2013.01); *G06T 2207/10048* (2013.01); *G06T 2207/30196* (2013.01)

(58) Field of Classification Search
CPC .. H04N 9/3179; H04N 9/3197; H04N 9/3185; H04N 9/3194; G06K 9/00362; G06T 7/60; G06T 2207/10048; G06T 2207/30196; G06T 7/62

USPC .......................................................... 348/744
See application file for complete search history.

(56) References Cited

U.S. PATENT DOCUMENTS

| 6,460,999 | B1 | 10/2002 | Suzuki |
| 9,268,520 | B1* | 2/2016 | Cederlof .................. G06F 3/16 |
| 2015/0084858 | A1 | 3/2015 | Murakami et al. |
| 2017/0047043 | A1 | 2/2017 | Ogasawara |

FOREIGN PATENT DOCUMENTS

| JP | 2001-075170 A | 3/2001 |
| JP | 2004-101622 A | 4/2004 |
| JP | 2004-341271 A | 12/2004 |
| JP | 2005-258292 A | 9/2005 |
| JP | 2013-164431 A | 8/2013 |
| JP | 2014-182332 A | 9/2014 |
| JP | 2015-064513 A | 4/2015 |
| JP | 2015-129876 A | 7/2015 |
| JP | 2017-037159 A | 2/2017 |

* cited by examiner

*Primary Examiner* — Jeff A Burke
*Assistant Examiner* — Sihar A Karwan
(74) *Attorney, Agent, or Firm* — Oliff PLC

(57) ABSTRACT

A display system includes a projector configured to project first image light based on first image information onto a projection surface, a detecting device configured to detect whether a person is present on a path on which the first image light passes, and a control device configured to cause, when the detecting device detects that a person is present on the path, the projector to project, instead of the first image light, second image light based on second image information different from the first image information.

11 Claims, 6 Drawing Sheets

DISPLAY SYSTEM, DISPLAY DEVICE, AND CONTROL METHOD FOR DISPLAY DEVICE

The present application is based on, and claims priority from JP Application Serial Number 2018-202099, filed Oct. 26, 2018, the disclosure of which is hereby incorporated by reference herein in its entirety.

BACKGROUND

1. Technical Field

The present disclosure relates to a display system, a display device, and a control method for the display device.

2. Related Art

There has been known a digital signage system that projects image light concerning an advertisement or the like onto a projection surface using a projector in a place where people pass such as a public facility (see JP A-2014-182332 (Patent Literature 1)).

In the system described in Patent Literature 1, when a person is present in a path on which the image light projected from the projector passes, at least a part of the image light is blocked by the person and does not reach the projection surface. Therefore, an image projected on the projection surface is formed as an image, at least a part of which is missing. A situation in which such a partially missing image is continuously displayed without being changed is undesirable.

SUMMARY

A display system according to an aspect of the present disclosure includes: a projector configured to project first image light based on first image information onto a projection surface; a detecting device configured to detect whether a person is present on a path on which the first image light passes; and a control device configured to cause, when the detecting device detects that a person is present on the path, the projector to project, instead of the first image light, second image light based on second image information different from the first image information.

A display device according to an aspect of the present disclosure includes: a projecting section configured to project first image light based on first image information onto a projection surface; a detecting section configured to detect whether a person is present on a path on which the first image light passes; and a control section configured to cause, when the detecting section detects that a person is present on the path, the projecting section to project, instead of the first image light, second image light based on second image information different from the first image information.

A control method for a display device according to an aspect of the present disclosure includes: projecting first image light based on first image information onto a projection surface; detecting whether a person is present on a path on which the first image light passes; and projecting, when it is detected that a person is present on the path, instead of the first image light, second image light based on second image information different from the first image information.

DESCRIPTION OF EXEMPLARY EMBODIMENTS

A: First Embodiment

A1: Overview of a Display System 1

Figure 1:
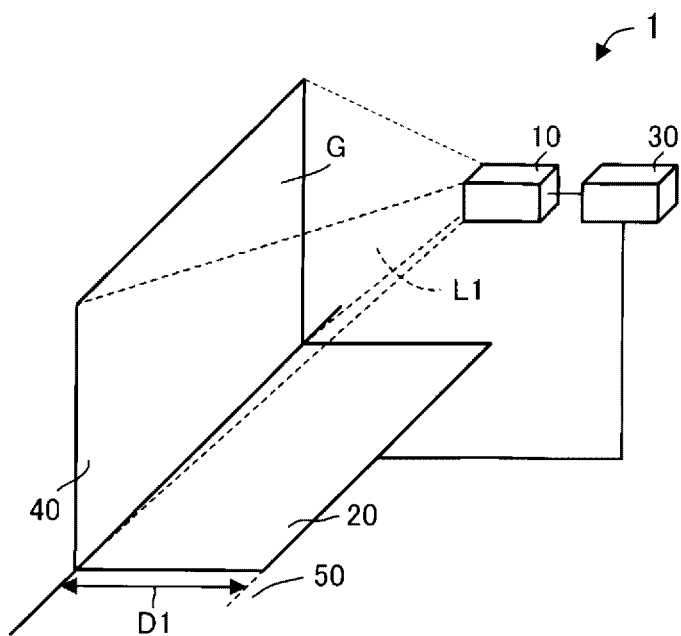
FIG. 1 is a diagram showing an example of a display system according to a first embodiment.

FIG. 1 is a diagram showing an example of a display system 1 according to a first embodiment.

The display system 1 is a digital signage system that displays an image of an advertisement or the like on a display surface in a store or the like. The display system 1 is not limited to the digital signage system and only has to be a projection system that projects and displays an image on a display surface.

The display system 1 includes a projector 10, a detecting device 20, and a control device 30.

The projector 10 projects image light concerning an advertisement or the like onto a projection surface 40 to thereby display an image G corresponding to the image light on the projection surface 40. The projector 10 is hung from a ceiling and projects the image light obliquely downward. The projector 10 is not limited to a form of hanging from the ceiling. The projection surface 40 is an example of a display surface and is, for example, a wall or a screen. A path L1 on which the image light passes is shown in FIG. 1.

The detecting device 20 detects whether a person is present on the path L1. In FIG. 1, a mat-like pressure sensor laid on a floor 50 is shown as an example of the detecting device 20.

The detecting device 20 is laid in a region located further on the projector 10 side than the projection surface 40 on the floor 50, the distance between the region and the projection surface 40 being equal to or smaller than a predetermined distance D1.

When a person is located on the detecting device 20, the detecting device 20 detects that the person is present on the path L1. On the other hand, when a person is not located on the detecting device 20, the detecting device 20 detects that a person is absent on the path L1. That is, the detecting device 20 detects, as a person present on the path L1, a person present between the projection surface 40 and the projector 10, the distance from the projection surface 40 to the person being equal to or smaller than the predetermined distance D1.

Figure 2:
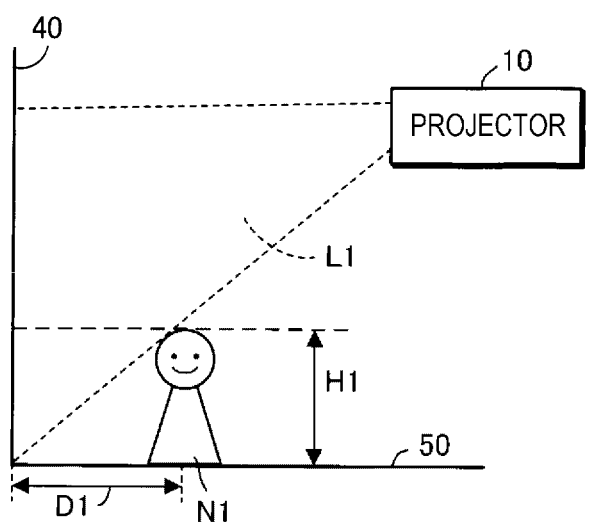
FIG. 2 is a diagram for explaining a detecting device.

Examples of the predetermined distance D1 include the distance from a position where a person N1 having a predetermined height H1 is in contact with the path L1 in an upright standing state to the projection surface 40 as illustrated in FIG. 2.

Examples of the predetermined height H1 include 130 cm considered to be a maximum height of a child having immature prudence. A person of prudence is considered to be less likely to intentionally intrude into the path L1. However, the child having immature prudence is considered to be highly likely to intentionally intrude into the path L1.

It is difficult to accurately determine presence or absence of prudence from height. Some person is considered to be likely to unintentionally intrude into the path L1. Therefore, the predetermined height H1 is not limited to 130 cm and may be larger than or smaller than 130 cm.

The detecting device 20 is not limited to the mat-like pressure sensor. For example, as the detecting device 20, a human sensor covering the path L1 as a detection region may be used or a human detecting device including a camera covering the path L1 as a photographing region may be used. The human detecting device including the camera detects, for example, based on an imaging result of the camera, whether a person is present on the path L1.

The control device 30 controls the projector 10. For example, the control device 30 switches, based on a result of the detection by the detecting device 20, the image light projected from the projector 10. The control device 30 is, for example, a PC (Personal Computer). The control device 30 is not limited to the PC. For example, a dedicated information processing device or the like may be used as the control device 30.

A2: Configuration Example of the Projector 10 and the Control Device 30

Figure 3:
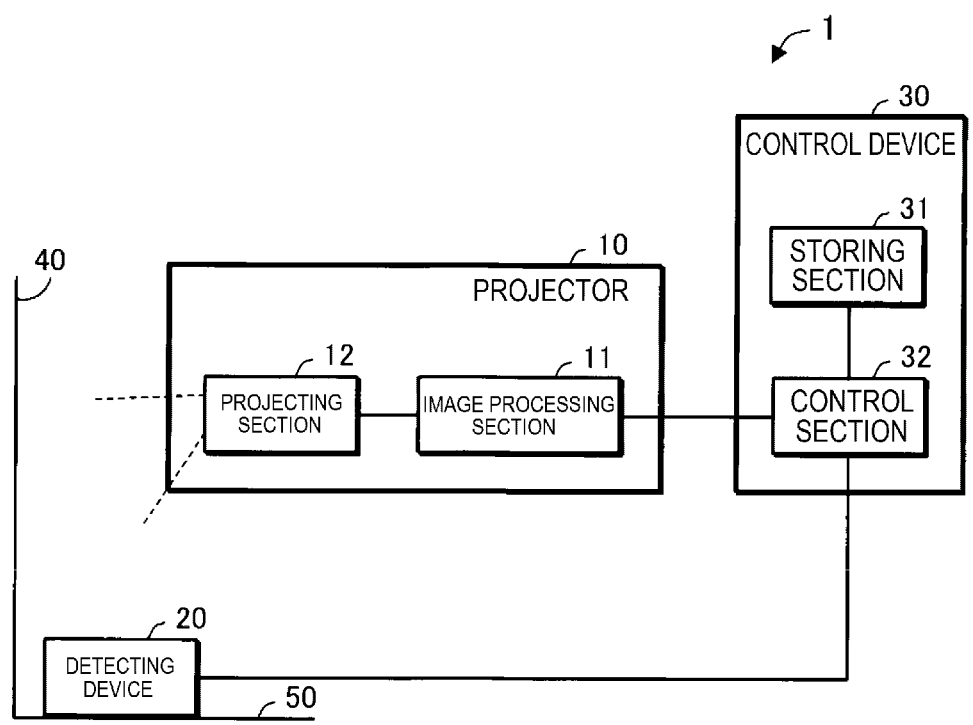
FIG. 3 is a diagram showing a configuration example of a projector and a control device.

FIG. 3 is a diagram showing a configuration example of the projector 10 and the control device 30. The projector 10 includes an image processing section 11 and a projecting section 12. The control device 30 includes a storing section 31 and a control section 32.

The image processing section 11 is a computer such as a CPU (Central Processing Unit). The image processing section 11 may be configured by one or a plurality of processing devices. The image processing section 11 may be configured by, for example, an electronic circuit such as an FPGA (Field Programmable Gate Array) or an ASIC (Application Specific IC) instead of or in addition to the CPU.

The image processing section 11 applies image processing to image information indicating an image to generate an image signal. The image processing applied by the image processing section 11 includes, for example, resolution conversion processing. In the resolution conversion processing, the image processing section 11 converts resolution of the image information into resolution that the projecting section 12 can cope with, specifically, the resolution of a liquid crystal light valve 123 explained below. The image processing section 11 may execute other image processing, for example, so-called gamma correction processing in addition to or instead of the resolution conversion processing.

The projecting section 12 projects image light based on the image signal generated by the image processing section onto the projection surface 40 and displays an image corresponding to the image light on the projection surface 40.

The storing section 31 is a computer-readable recording medium. The storing section 31 includes, for example, a ROM (Read Only Memory) and a RAM (Random Access Memory). The storing section 31 stores various kinds of information and computer programs executed by the control section 32.

The control section 32 is a computer such as a CPU. The control section 32 may be configured by one or a plurality of processors. The control section 32 may be configured by, for example, an electronic circuit such as an FPGA or an ASIC instead of or in addition to the CPU. The control section 32 controls the projector 10 by reading and executing the computer programs stored in the storing section 31.

A3: Configuration Example of the Projecting Section 12

Figure 4:
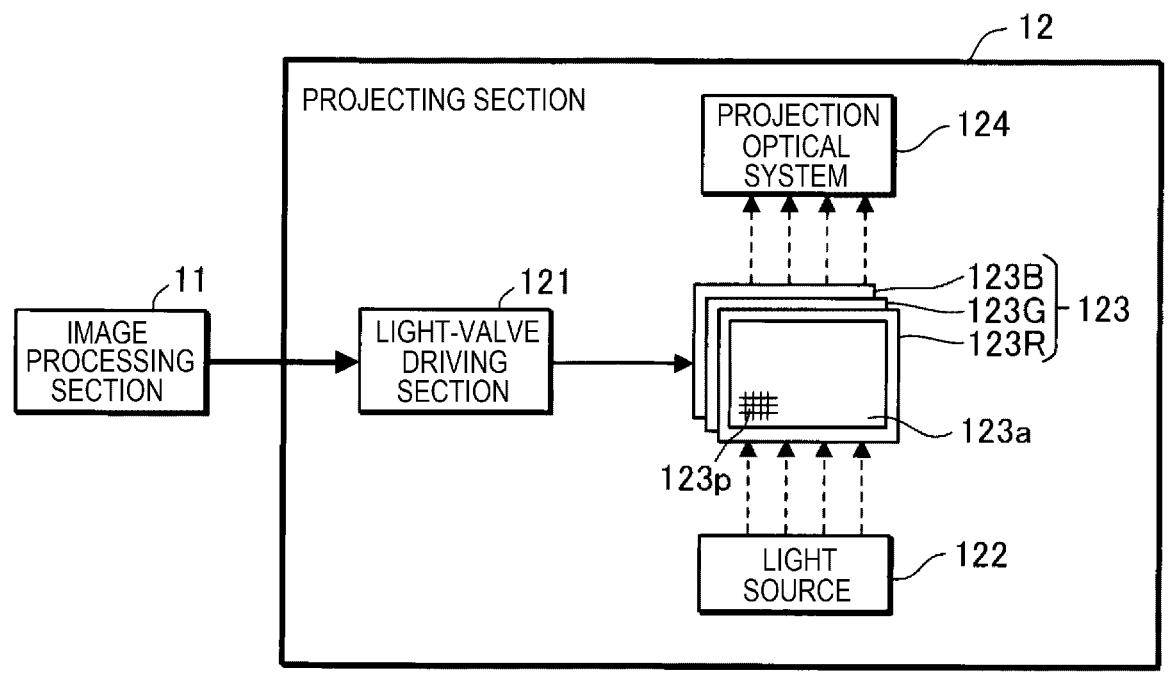
FIG. 4 is a diagram showing an example of a projecting section.

FIG. 4 is a diagram showing an example of the projecting section 12. The projecting section 12 includes a light-valve driving section 121, a light source 122, a liquid crystal light valve for red 123R, a liquid crystal light valve for green 123G, a liquid crystal light valve for blue 123B, and a projection optical system 124. In the following explanation, when it is unnecessary to distinguish the liquid crystal light valve for red 123R, the liquid crystal light valve for green 123G, the liquid crystal light valve for blue 123B from one another, these liquid crystal light valves are referred to as "liquid crystal light valve(s) 123".

The light-valve driving section 121 drives the liquid crystal light valves 123 based on an image signal generated by the image processing section 11.

The light source 122 is a Xenon lamp, an ultra-high pressure mercury lamp, an LED (Light Emitting Diode), a laser beam source, or the like. Fluctuation in a luminance distribution of light emitted from the light source 122 is reduced by a not-shown integrator optical system. Thereafter, the light is separated into color light components of red, green, and blue, which are the three primary colors of light, by a not-shown color separation optical system. The color light component of red is made incident on the liquid crystal light valve for red 123R. The color light component of green is made incident on the liquid crystal light valve for green 123G. The color light component of blue is made incident on the liquid crystal light valve for blue 123B.

The liquid crystal light valve 123 is configured by a liquid crystal panel or the like in which liquid crystal is present between a pair of transparent substrates. The liquid crystal light valve 123 includes a rectangular pixel region 123a including a plurality of pixels 123p located in a matrix shape. In the liquid crystal light valve 123, a driving voltage is applied to the liquid crystal for each of the pixels 123p. When the light-valve driving section 121 applies a driving voltage based on an image signal to the pixels 123p, the pixels 123p are set to light transmittance based on the driving voltage. Therefore, the light emitted from the light source 122 passes the pixel region 123a to be modulated. Single color image light based on the image signal is formed for each of color lights.

Single color image lights of the colors are combined for each of the pixels 123p by a not-shown color combination optical system. Image light, which is a color image, is generated. The image light is projected onto the projection surface 40 by the projection optical system 124.

A4: Operation of the Display System 1

Figure 5:
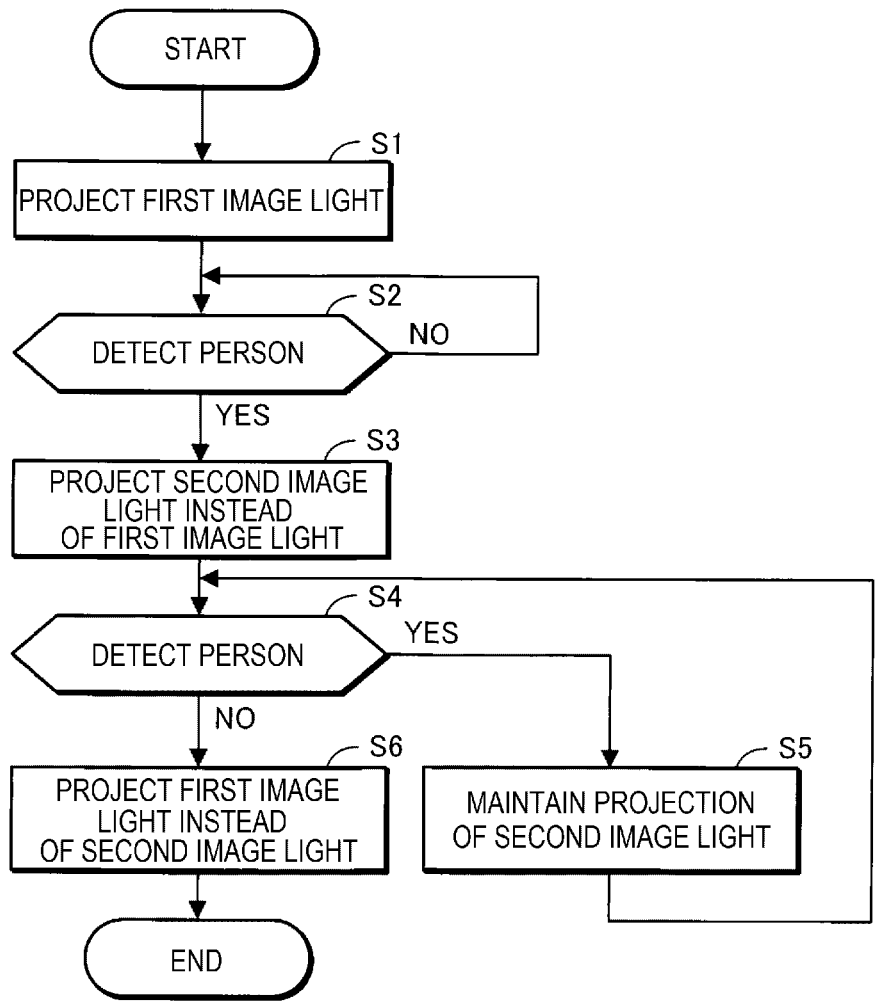
FIG. 5 is a flowchart for explaining the operation of the display system.

FIG. 5 is a flowchart for explaining the operation of the display system 1.

In step S1, the control device 30 causes the projector 10 to project first image light onto the projection surface 40. An example of step S1 is explained below.

The control section 32 provides first image information representing a first image G1 indicated by the first image light to the image processing section 11. In this embodiment, the first image information is stored in the storing section 31 in advance. The control section 32 reads the first image information from the storing section 31 and provides the first image information read from the storing section 31 to the image processing section 11. The first image information may be generated by the control section 32 or may be supplied to the control device 30 from another device.

The image processing section 11 applies image processing to the first image information provided from the control section 32 to generate a first image signal. The projecting section 12 projects the first image light based on the first image signal, that is, the first image light based on the first image information onto the projection surface 40 and displays the first image G1 on the projection surface 40.

Figure 6:
FIG. 6 is a diagram showing an example of a first image.

FIG. 6 is a diagram showing an example of the first image G1. In the first image G1 shown in FIG. 6, a part of a character string C1 is present within a range of a distance H1 from the floor 50. Therefore, when a person is present on the path L1, a part of the character string C1 is blocked by the person present on the path L1 and does not reach the projection surface 40. Distinction of the character string C1 is likely to be difficult.

Referring back to FIG. 5, subsequently, when, in step S2, the detecting device 20 detects a person present on the path L1, in step S3, the control device 30 causes the projector 10 to project second image light instead of the first image light. An example of step S3 is explained below.

When the detecting device 20 detects the person present on the path L1, the control section 32 provides second image information different from the first image information to the image processing section 11 instead of the first image information. In this embodiment, the second image information is stored in the storing section 31 in advance. The control section 32 reads the second image information from the storing section 31 and provides the second image information read from the storing section 31 to the image processing section 11 instead of the first image information. The second image information may be generated by the control section 32 or may be supplied to the control device 30 from another device.

The image processing section 11 applies image processing to the second image information provided from the control section 32 to generate a second image signal. The projecting section 12 projects second image light based on the second image signal, that is, the second image light base on the second image information onto the projection surface 40 and displays a second image G2 on the projection surface 40.

In this way, when the person is present on the path L1, the second image light is projected instead of the first image light. Therefor, it is possible to suppress the first image G1, at least a part of which is missing because of the person present on the path L1, from being continuously displayed without being changed.

Figure 7:
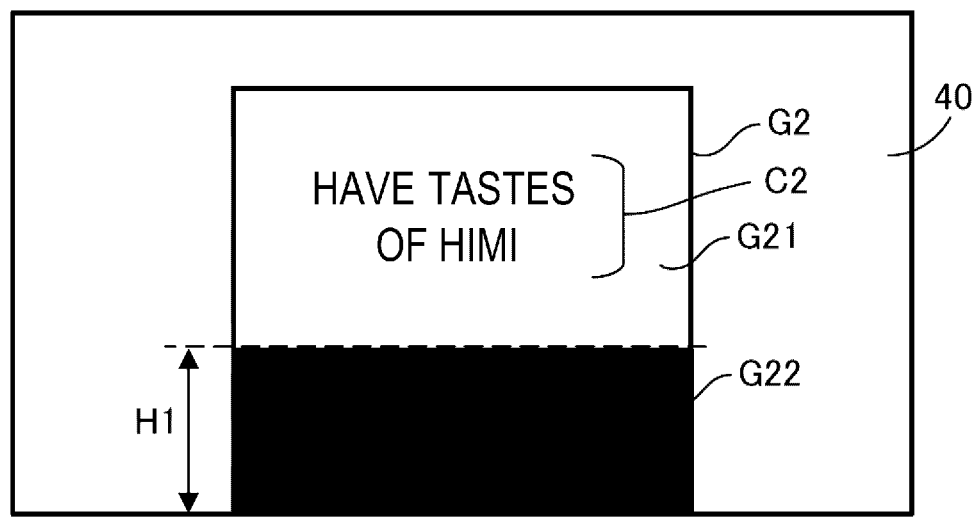
FIG. 7 is a diagram showing an example of a second image.

FIG. 7 is a diagram showing an example of the second image G2. The second image G2 shown in FIG. 7 includes a first region G21 and a second region G22 located below the first region G21. In the following explanation, in the second image light, a portion indicating the first region G21 is referred to as "first portion" and a portion indicating the second region G22 is referred to as "second portion".

The second region G22 is a range in which the distance from the floor 50 is smaller than H1 in the second image G2. The first region G21 is a range in which the distance from the floor 50 is equal to or larger than H1 in the second image G2.

Therefore, when a person having height smaller than the height H1 is present on the path L1, the first portion indicating the first region G21 is not projected onto the person having the height smaller than the height H1 present in the path L1 and the second portion indicating the second region G22 is projected onto the person having the height smaller than the height H1 present on the path L1.

In other words, the control device 30 controls the projector 10 not to project the first portion onto the person present on the path L1 and to project the second portion onto the person present on the path L1.

The second portion is darker than the first portion. Therefore, compared with a case where the person present on the path L1 is irradiated by the first portion, discomfort given to the person present on the path L1 can be reduced when the person present on the path L1 is irradiated by the second portion.

"The second portion is darker than the first portion" means that, for example, average brightness of the second portion is lower than average brightness of the first portion. The second region G22 represented by the second portion may be, for example, black or may not be black.

In the second image G2, a character string C2 is included in the first region G21 but no character string is included in the second region G22. Therefore, even if the person having the height smaller than the height H1 is present on the path L1, the character string C2 included in the second image G2 can be continuously displayed without missing any part. Accordingly, an image advertisement by the display system 1 effectively functions. The store can easily introduce the display system 1.

Referring back to FIG. 5, after the second image light is projected, when, in step S4, the detecting device 20 detects the person present on the path L1, in step S5, the control device 30 causes the projector 10 to maintain the projection of the second image light. For example, in step S5, the control section 32 maintains the provision of the second image information to the image processing section 11. Thereafter, the processing returns to step S4.

On the other hand, when, in step S4, the detecting device 20 detects that a person is absent on the path L1, in step S6, the control device 30 causes the projector 10 to project the first image light instead of the second image light. For example, when the detecting device 20 detects that a person is absent on the path L1, the control section 32 provides the first image information to the image processing section 11 instead of the second image information. The image processing section 11 applies image processing to the first image information provided from the control section 32 to generate the first image signal. The projecting section 12 projects the first image light based on the first image signal onto the projection surface 40 and displays the first image G1.

Therefore, when a person disappears from the path L1, the second image light can be automatically switched to the first image light. Since the second region G22 is not provided in the first image G1, when a person is absent on the path L1, it is possible to display an advertisement using the entire surface of a projected image on the projector 10, that is, the entire surface of the first image G1.

B: MODIFICATIONS

In the first embodiment, for example, configurations illustrated below may be adopted.

B1: Modification 1

Figure 8:
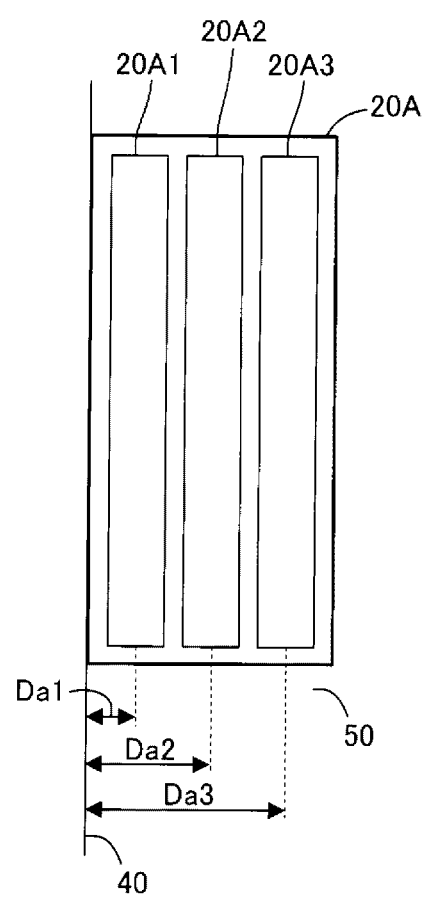
FIG. 8 is a diagram showing an example of a distance detecting device.

In the first embodiment, the detecting device 20 may further detect the distance between a person detected by the detecting device 20 and the projection surface 40. For example, a distance detecting device 20A including a first pressure sensor 20A1, a second pressure sensor 20A2, and a third pressure sensor 20A3 illustrated in FIG. 8 may be used as the detecting device 20.

The distances respectively from the first pressure sensor 20A1, the second pressure sensor 20A2, and the third pressure sensor 20A3 to the projection surface 40 are longer in the order of the first pressure sensor 20A1, the second pressure sensor 20A2, and the third pressure sensor 20A3. In the following explanation, the distances respectively from the first pressure sensor 20A1, the second pressure sensor 20A2, and the third pressure sensor 20A3 to the projection surface 40 are respectively represented as a distance Da1, a distance Da2, and a distance Da3. It is assumed that a relation of the distance Da1<the distance Da2<the distance Da3 holds.

When a person is present on the first pressure sensor 20A1, the distance detecting device 20A detects that the person present on the path L1 is present in a position at the distance Da1 from the projection surface 40.

When a person is present on the second pressure sensor 20A2, the distance detecting device 20A detects that the person present on the path L1 is present in a position at the distance Da2 from the projection surface 40.

Similarly, when a person is present on the third pressure sensor 20A3, the distance detecting device 20A detects that the person present on the path L1 is present in a position at the distance Da3 from the projection surface 40.

When a person is present on a plurality of pressure sensors among the first pressure sensor 20A1, the second pressure sensor 20A2, and the third pressure sensor 20A3, the control section 32 of the control device 30 determines that the person is present on the pressure sensor at the shortest distance from the projection surface 40 among the plurality of pressure sensors on which the person is present.

When the distance between the person detected by the detecting device 20 and the projection surface 40 is detected, the control device 30, specifically, the control section 32 sets a ratio of the area of the second region G22 displayed on the projection surface 40 by the second portion of the second image light to the area of the second image G2 displayed on the projection surface 40 by the second image light higher as the distance between the person detected by the distance detecting device 20A and the projection surface 40 is shorter. In the following explanation, the distance between the person detected by the distance detecting device 20A and the projection surface 40 is referred to as "separation distance".

Figure 9:
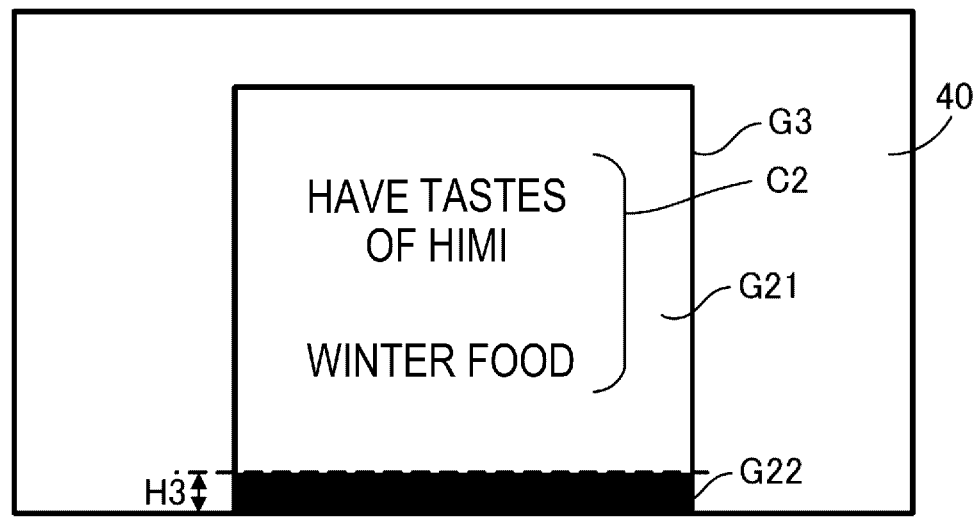
FIG. 9 is a diagram showing an example of an image.
Figure 10:
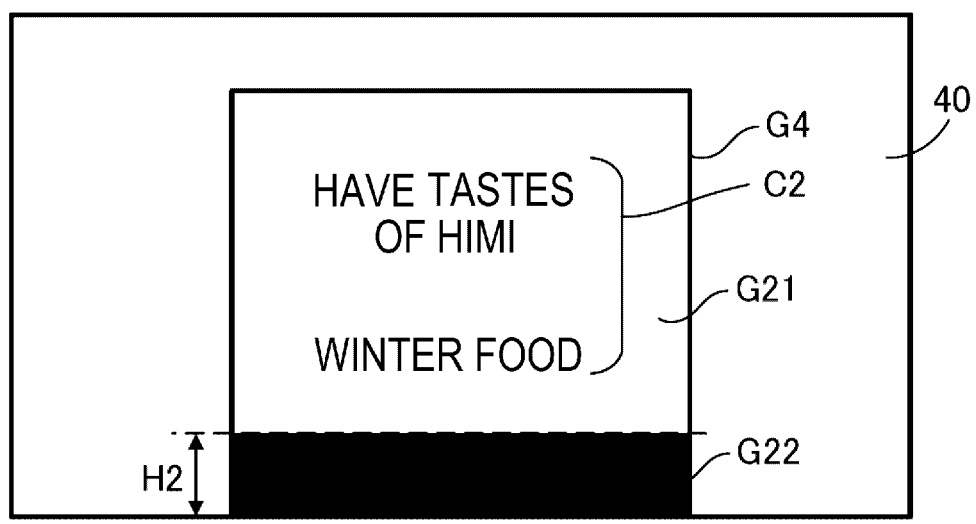
FIG. 10 is a diagram showing an example of an image.
Figure 11:
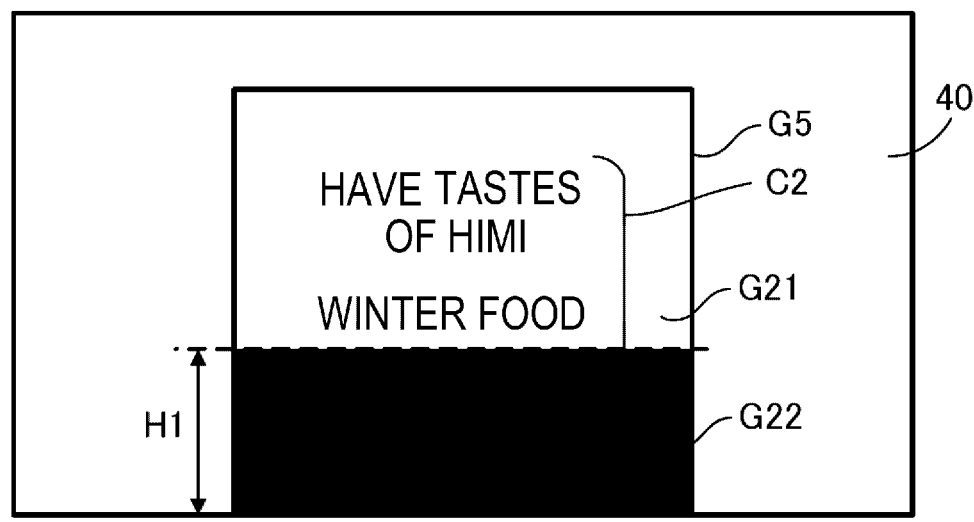
FIG. 11 is a diagram showing an example of an image.

For example, when the separation distance is the distance Da3, the control section 32 provides, as the second image information, image information indicating an image G3 illustrated in FIG. 9 to the image processing section 11. When the separation distance is the distance Da2, the control section 32 provides, as the second image information, image information indicating an image G4 illustrated in FIG. 10 to the image processing section 11. When the separation distance is the distance Da1, the control section 32 provides, as the second image information, image information indicating an image G5 illustrated in FIG. 11 to the image processing section 11.

The following relation is satisfied: a ratio of the area of the second region G22 to the area of the image G3 in the image G3< a ratio of the area of the second region G22 to the area of the image G4 in the image G4< a ratio of the area of the second region G22 to the area of the image G5 in the image G5.

In this way, a ratio of the area of the second region G22 to the area of an image indicated by image information is higher as the person present on the path L1 is closer to the projection surface 40. Accordingly, even if the person present on the path L1 approaches the projection surface 40, it is possible to reduce likelihood that the person hides information such as the character string C2 displayed in the first region G21.

In the modification 1, the detecting method for the separation distance and the image displayed in the first region G21 can be changed. In the modification 1, the three images including the first region G21 and the second region G22 are switched according to the separation distance. However, two images including the first region G21 and the second region G22 or four or more images including the first region G21 and the second region G22 may be switched according to the separation distance.

B2: Modification 2

In the first embodiment, the detecting device 20 may further detect the height of the person detected by the detecting device 20. For example, a height detecting device 20B illustrated in FIG. 12 may be used as the detecting device 20.

Figure 12:
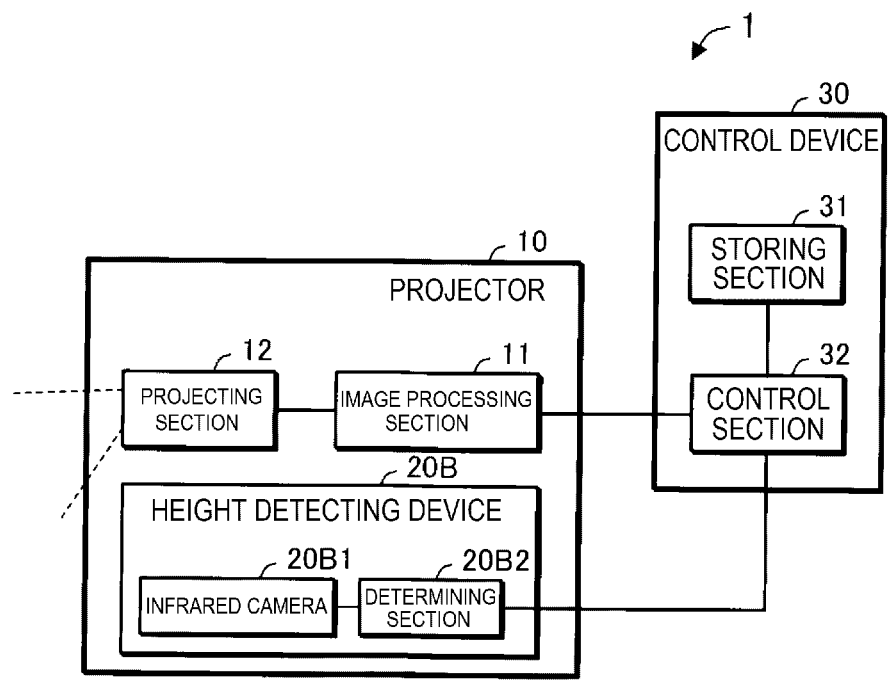
FIG. 12 is a diagram showing an example of a height detecting device.

The height detecting device 20B illustrated in FIG. 12 is provided in the projector 10 and includes an infrared camera 20B1 and a determining section 20B2. The infrared camera 20B1 images the projection surface 40. The determining section 20B2 detects, based on a result of the imaging of the infrared camera 20B1, a person present on the path L1 and the height of the person.

In this case, the control device 30 may set a ratio of the area of the second region G22 displayed on the projection surface 40 by the second portion to the area of the second image G2 displayed on the projection surface 40 by the second image light higher as the height of the person detected by the height detecting device 20B is larger. In the following explanation, for convenience of explanation, it is assumed that a relation of height H3<height H2<height H1 holds.

For example, when the height detected by the height detecting device 20B is smaller than the height H3, the control section 32 provides, as the second image information, image information indicating the image G3 illustrated in FIG. 9 to the image processing section 11. When the height detected by the height detecting device 20B is equal to or larger than the height H3 and smaller than the height H2, the control section 32 provides, as the second image information, image information indicating the image G4 illustrated in FIG. 10 to the image processing section 11. When the height detected by the height detecting device 20B is equal to or larger than the height H2 and smaller than the height H1, the control section 32 provides, as the second image information, image information indicating the image G5 illustrated in FIG. 11 to the image processing section 11.

In the modification 2, a ratio of the area of the second region G22 to the area of an image indicated by image information is higher as the height of the person present on the path L1 is larger. Accordingly, even if the height of the person present on the path L1 is large, it is possible to reduce likelihood that the person hides information such as the character string C2 displayed in the first region G21.

In the modification 2, the detecting method for the height and the image displayed in the first region G21 can be changed. In the modification 2, the three images including the first region G21 and the second region G22 are switched according to the height detected by the height detecting device 20B. However, two images including the first region G21 and the second region G22 or four or more images including the first region G21 and the second region G22 may be switched according to the height detected by the height detecting device 20B.

B3: Modification 3

In the first embodiment and the modifications 1 and 2, the control device 30 may be incorporated in the projector 10. When the control device 30 is incorporated in the projector 10 in the modification 2, the height detecting device 20B configures an example of a detecting section, the control device 30 configures an example of a control section, the projector 10 configures an example of a display device, and the control method for the projector 10 configures an example of a control method for the display device.

B4: Modification 4

In the first embodiment and the modifications 1 to 3, a user may select and set the first image information and the second image information beforehand. The control section 32 may automatically select the first image information and the second image information out of a plurality of kinds of image information based on a luminance distribution of an image indicated by the image information.

For example, out of the plurality of kinds of image information, the control section 32 selects, as the second image information, image information indicating an image in which the second region G22 is present and selects, as the first image information, image information indicating an image in which the second region G22 is absent. When the control section 32 automatically selects the first image information and the second image information, it is possible to reduce a burden on the user for selecting the first image information and the second image information.

B5: Modification 5

In the first embodiment and the modifications 1 to 4, the liquid crystal light valve 123 is used as an example of the light modulating device. However, the light modulating device is not limited to the liquid crystal light valve and can be changed as appropriate. For example, the light modulating device may be a component including three reflection-type liquid crystal panels. The light modulating device may be a component of a type including one liquid crystal panel, a type including three digital mirror devices (DMDs), a type including one digital mirror device, or the like. When only one liquid crystal panel or DMD is used as the light modulating device, members equivalent to the color separation optical system and the color combination optical system are unnecessary. Besides the liquid crystal panel and the DMD, a component capable of modulating light emitted by the light source 122 can be adopted as the light modulating device.

B6: Modification 6

When an obstacle is present on the path L1 on which the image light projected from the projector 10 passes, an image on the projection surface 40 is formed as an image, at least apart of which is missing. Therefore, in the first embodiment and the modifications 1 to 5, the detecting device 20 may detect a moving obstacle instead of or together with a person. According to the modification 6, when the obstacle is present on the path L1, the second image light is projected instead of the first image light. Therefore, it is possible to suppress the first image G1, at least a part of which is missing because of the obstacle present on the path L1, from being continuously displayed without being changed.

What is claimed is:

1. A display system comprising:
   a projector configured to project first image light based on first image information onto a projection surface;
   a detecting device configured to detect a person present on a path on which the first image light passes and detect a height of the person, wherein the first image light is projected on an area with a first outer boundary; and
   a control device configured to cause, due to the detecting device detecting that the person is present on the path, the projector to project, instead of the first image light, second image light based on second image information different from the first image information, wherein
   the second image light is projected on the area with a second outer boundary coextensive with the first outer boundary and includes a first portion and a second portion darker than the first portion, wherein combined areas of the first portion and the second portion are coextensive with the area, and
   the control device is configured to
      control the projector not to project the first portion onto the person present on the path and to project the second portion onto the person present on the path, and
      set a ratio of (a) to (b) higher as the height of the person is larger, where (a) is an area of an image displayed on the projection surface by the second portion and (b) is an area of an image displayed on the projection surface by the second image light.

2. The display system according to claim 1, wherein the first portion represents a region including a character, and
the second portion represents a region not including the character.

3. The display system according to claim 1, wherein the detecting device is configured to detect a distance between the person detected by the detecting device and the projection surface, and
the control device is configured to set a ratio of an area of an image displayed on the projection surface by the second portion to an area of an image displayed on the projection surface by the second image light higher as the distance is shorter.

4. A display device comprising:
   a projecting section configured to project first image light based on first image information onto a projection surface;
   a detecting section configured to detect a person present on a path on which the first image light passes and detect a height of the person, wherein the first image light is projected on an area with a first outer boundary; and
   a control section configured to cause, due to the detecting section detecting that the person is present on the path, the projecting section to project, instead of the first image light, second image light based on second image information different from the first image information, wherein
   the second image light is projected on the area with a second outer boundary coextensive with the first outer boundary and includes a first portion and a second portion darker than the first portion, wherein combined areas of the first portion and the second portion are coextensive with the area, and the control section is configured to
control the projecting section not to project the first portion onto the person present on the path and to project the second portion onto the person present on the path, and
set a ratio of (a) to (b) higher as the height of the person is larger, where (a) is an area of an image displayed on the projection surface by the second portion and (b) is an area of an image displayed on the projection surface by the second image light.

5. The display device according to claim 4, wherein the first portion represents a region including a character, and
the second portion represents a region not including the character.

6. The display device according to claim 4, wherein the detecting section is configured to detect a distance between the person detected by the detecting section and the projection surface, and
the control section is configured to set a ratio of an area of an image displayed on the projection surface by the second portion to an area of an image displayed on the projection surface by the second image light higher as the distance is shorter.

7. The display device according to claim 4, wherein the detecting section detects pressure.

8. A control method for a display device, the control method comprising:
projecting first image light based on first image information onto a projection surface, wherein the first image light is projected on an area with a first outer boundary;
detecting that a person is present on a path on which the first image light passes;
detecting a height of the person;
projecting, due to detecting that the person is present on the path, instead of the first image light, second image light based on second image information different from the first image information, wherein the second image light is projected on the area with a second outer boundary coextensive with the first outer boundary and includes a first portion and a second portion darker than the first portion, wherein combined areas of the first portion and the second portion are coextensive with the area;
projecting the second portion onto the person present on the path and not projecting the first portion onto the person present on the path; and
setting a ratio of (a) to (b) higher as the height of the person is larger, where (a) is an area of an image displayed on the projection surface by the second portion and (b) an area of an image displayed on the projection surface by the second image light.

9. The control method for the display device according to claim 8, wherein
the first portion represents a region including a character, and
the second portion represents a region not including the character.

10. The control method for the display device according to claim 8, wherein
a distance between the person present on the path and the projection surface is detected, and
a ratio of an area of an image displayed on the projection surface by the second portion to an area of an image displayed on the projection surface by the second image light is set higher as the distance is shorter.

11. A control method for a display device, the control method comprising:
projecting first image light based on first image information onto a projection surface, wherein the first image light is projected on an area with a first outer boundary;
detecting that a person is present on a path on which the first image light passes;
detecting a distance between the person and the projection surface;
projecting, due to detecting that the person is present on the path, instead of the first image light, second image light based on second image information different from the first image information, wherein the second image light is projected on the area with a second outer boundary coextensive with the first outer boundary and includes a first portion and a second portion darker than the first portion, wherein combined areas of the first portion and the second portion are coextensive with the area; and
setting a ratio of (a) to (b) higher as the distance is shorter, where (a) is an area of an image displayed on the projection surface by the second portion and (b) is an area of an image displayed on the projection surface by the second image light.

* * * * *